United States Patent [19]

Hirasawa

[11] Patent Number: 4,887,075

[45] Date of Patent: Dec. 12, 1989

[54] LOCAL AREA NETWORK SYSTEM WITH A MULTI-COMPUTER SYSTEM COUPLED THERETO AND METHOD FOR CONTROLLING THE SAME

[75] Inventor: Yutaka Hirasawa, Kokubunji, Japan

[73] Assignee: Kabushiki Kaisha Toshiba, Kawasaki, Japan

[21] Appl. No.: 207,832

[22] Filed: Jun. 17, 1988

[30] Foreign Application Priority Data

Jun. 19, 1987 [JP] Japan .................. 62-151349

[51] Int. Cl.$^4$ .......................... H04J 3/17; H04Q 5/00
[52] U.S. Cl. .................. 340/825.030; 340/825.520; 340/825.500; 340/825.510; 364/200; 364/240; 370/85.1; 370/93
[58] Field of Search ............. 340/825.03, 825.49, 340/825.47, 825.05, 825.51, 825.51; 370/85, 89, 94, 86, 93; 379/57, 207, 220; 364/200, 240, 240.1, 240.2, 131, 132, 133, 134

[56] References Cited

U.S. PATENT DOCUMENTS

| | | | |
|---|---|---|---|
| 3,924,240 | 12/1975 | Given | 370/85 |
| 4,680,581 | 7/1987 | Kozlik et al. | 370/85 |
| 4,706,080 | 11/1987 | Sincoskie | 340/825.52 |
| 4,760,572 | 7/1988 | Tonikawa | 340/825.52 |

OTHER PUBLICATIONS

"Automatic Distributed Database", IBM Technical Disclosure Bulletin, vol. 30, No. 1, Jun. 1987, pp. 107, 108.

IEEE Standard 802.3 CSMA/CD Access Method & Physical Layer Specification, Jul. 1983, pp. 12-14.

Primary Examiner—Donald J. Yusko
Assistant Examiner—Eric Pudpud
Attorney, Agent, or Firm—Finnegan, Henderson, Farabow, Garrett and Dunner

[57] ABSTRACT

A LAN system comprises LAN controllers provided for computer systems that constitute a multi-computer system. Each LAN controller has a memory section in which a LAN address common to the multi-computer system is set in accordance with a command from a master computer of the computer systems, and a register section for holding a reception permit command (flag) from the master computer system. Only when the reception permit command is held in the register section, a transmission frame whose destination address is the LAN address held in the memory section is selectively received from a LAN and transferred to the master computer system.

14 Claims, 4 Drawing Sheets

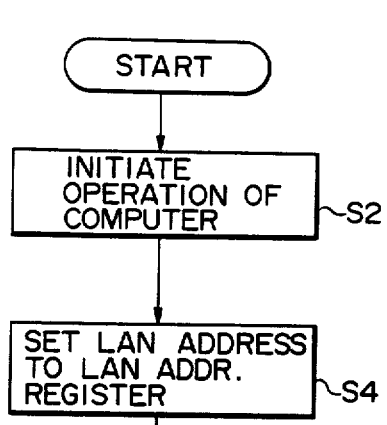
F I G. 2A
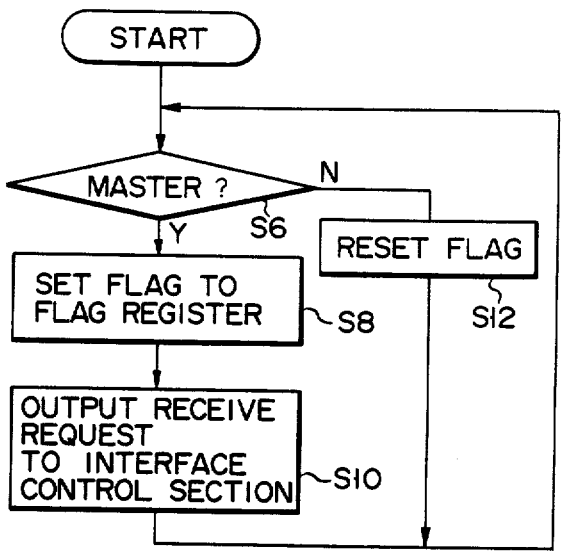
F I G. 2B
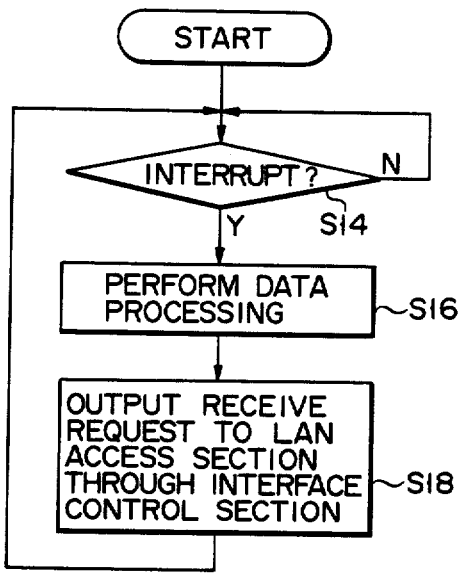
F I G. 2C

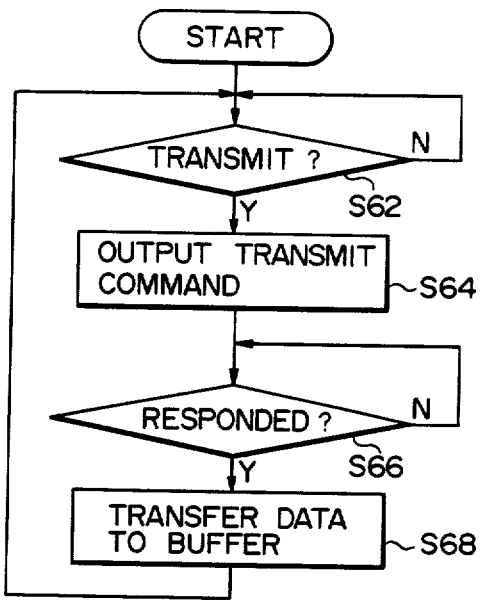
F I G. 3A
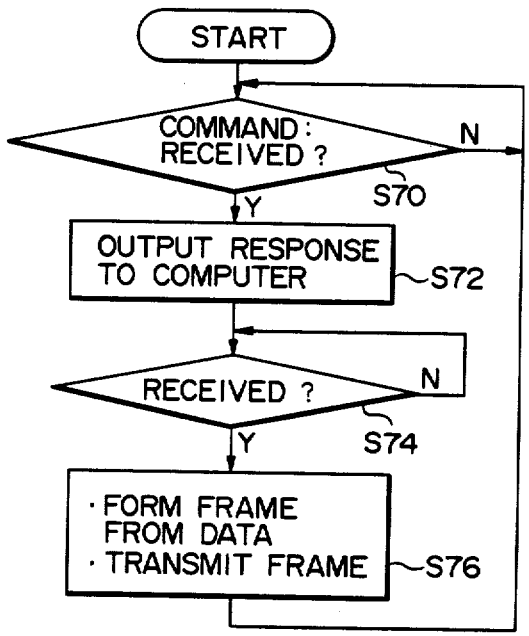
F I G. 3B

LOCAL AREA NETWORK SYSTEM WITH A MULTI-COMPUTER SYSTEM COUPLED THERETO AND METHOD FOR CONTROLLING THE SAME

BACKGROUND OF THE INVENTION

1. Field of the Invention

The present invention relates to a local area network (LAN) system with a multi-computer system coupled thereto, and, more particularly, to a communication method for ensuring effective communication of transfer frames by assigning the same address to a multi-computer system and a LAN system for realizing the same.

2. Description of the Related Art

Conventionally, it is unlikely that a multicomputer system is coupled to a LAN. From typical ways of providing connection to a LAN, there are two methods available for coupling a multi-computer system to the LAN. The first one is to allow individual computers to have their own communication controllers through which they are coupled to a LAN cable. To specify the individual communication controllers on the LAN, the controllers should have different or unique addresses in accordance with the rules of the LAN. Accordingly, an external computer that needs communication with a multi-computer system should have some means to detect which computer of the system is presently active or a master and should send data to the communication controller coupled to that computer. However, this detection means has a complicated structure and requires such means as PIO (process input/output) and system control programs, so that it is not suitable for a general use, nor is it cost-effective.

The second method is to couple a single communication controller to a multi-computer system via a multi-computer bus such that the individual computers constituting the system are coupled to a LAN cable through the controller. Although overcoming the problem of the first system, the second system needs means for informing the communication controller of which computer is active and means for effecting data transfer between the active computer and controller itself over the multi-computer bus. Generally, this type of bus needs more complicated control and has a lower speed as compared with internal buses of the computers. This obstructs effective utilization of the high-speed communication of the LAN (typically, 2 to 100 Mbps) and increases the manufacturing cost.

SUMMARY OF THE INVENTION

Accordingly, it is an object of this invention to provide a communication method for ensuring communication such that each of LAN (local area network) controllers, provided for the individual computers constituting a multi-computer system to couple them to a LAN, is considered by an external computer as only one communication controller for the system.

A LAN system, which has a multi-computer system with a plurality of computer systems coupled to a LAN, comprises:

data storage means for storing control data indicating which one of the computer systems of the multicomputer systems is available for communication; and communication means for selectively transferring to the available computer system a frame to be sent over the LAN to the multi-computer system in accordance with the control data.

A method for providing effective communication with a multi-computer system coupled to a LAN and having a plurality of computer systems, comprises the steps of:

storing control data indicating which one of the computer systems of the multi-computer system is available for communication; and selectively transferring to the available computer system a frame to be sent over the LAN to the multicomputer system in accordance with the control data.

According to this invention, as described above, although LAN controllers are provided for the respective computers constituting a multi-computer system to increase the speed of data transfer between the associated computers and LAN controllers, the multi-computer system can be treated as if it has only one LAN controller by external computers coupled to the same LAN. Therefore, these external computers need not think of the individual LAN controllers and thus need not consider a computer presently serving as a master.

BRIEF DESCRIPTION OF THE DRAWINGS

FIGS. 2A to 2D are flowcharts for explaining a data reception operation according to the embodiment;

FIGS. 3A and 3B are flowcharts for explaining a data transmission operation according to the embodiment.

DETAILED DESCRIPTION OF THE PREFERRED EMBODIMENTS

With reference to the accompanying drawings, a local area network (LAN) system embodying this invention, which can effectively communicate with a multicomputer system, will be explained below.

Figure 1:
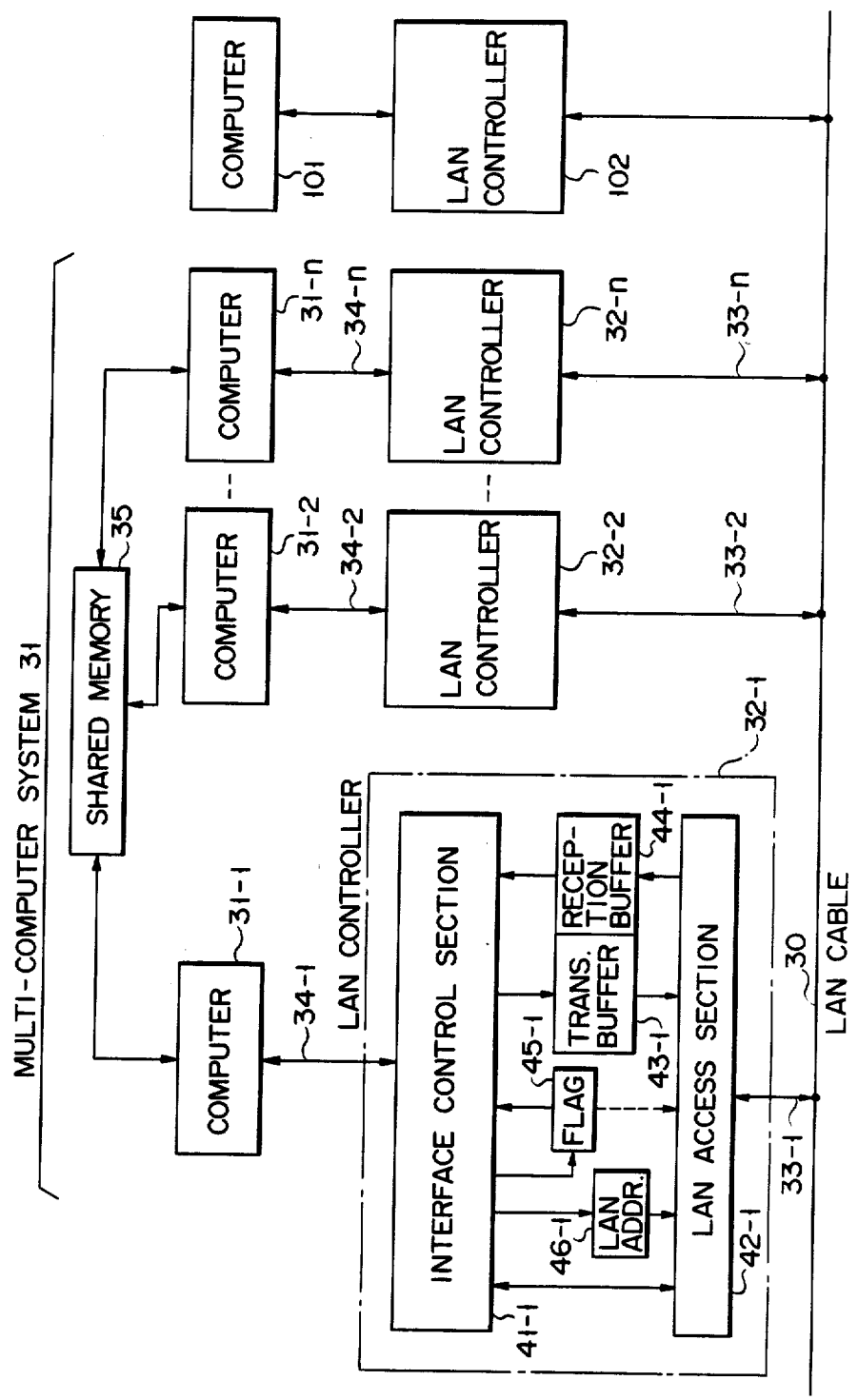
FIG. 1 is a block diagram illustrating one embodiment of a local area network system according to this invention.
Figure 2D:
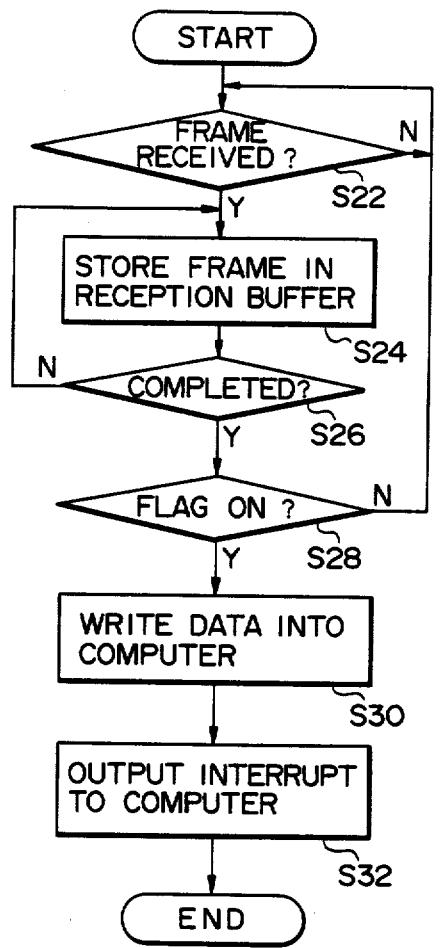

FIG. 1 illustrates the structure of a LAN system according to a first embodiment of this invention. This LAN system includes a multi-computer system 31, which is of a well known type and comprises computers 31-$i$ ($i=1$ to n) each having a CPU, a memory, a disk drive and a terminal (all not shown). LAN controllers 32-$i$ are coupled over buses 34-$i$ to the respective computers 31-$i$ and are coupled to a LAN cable 30 through the respective connection means 33-$i$ each constituted by a transceiver and a transceiver cable. Buses 34-$i$ are used to transfer commands (including a reception request) from computers 31-$i$ to LAN controllers 32-$i$, interrupts from the latter to the former and transmission/reception data therebetween.

The individual LAN controllers 32-$i$ have the same basic structure, so that only a description of LAN controller 32-1 will be given below. An interface control section 41-1 translates commands from the associated computer 31-1, generates an interrupt to computer 31-1, and transfers data to and from computer 31-1. A LAN access section 42-1 transfers data to and receives data from LA cable 30. Buffers 43-1 and 44-1 are used for transferring data between interface control section 41-1 and LAN access section 42-1; the former buffer 43-1 is a transmission buffer for temporarily storing transmission data sent onto LAN cable 30 from computer 31-1, and the latter 44-1 is a reception buffer for temporarily storing data from LAN cable 30 to be sent to computer 31-1. A flag register 45-1 is set by interface control section 41 to be ON/OFF in accordance with a command from computer 31-1, thereby indicating reception enable or disable. LAN address register 46-1 is for storing a LAN address, the LAN address being set in register 46-1 by interface control section 41 in accordance with a command from computer 31-1.

Multi-computer system 31 includes shared memory 35, and one of the computers in this system 31 is designated as the master computer by control data stored in the shared memory 35.

An external computer 101, not a constituent of multi-computer system 31, is coupled to LAN cable 30 through a LAN controller 102.

Referring now to FIGS. 2A to 2D, the operation of this embodiment will be explained.

Assume that computer 31-1 of multi-computer system 31 becomes active (step S2). Then, computer 31-1 sends a LAN address setting command to LAN controller 32-1 over bus 34-1 in step S4. This command from computer 31-1 is received by interface control section 41-1 in LAN controller 32-1. A LAN address of the received LAN address setting command is set in LAN address register 46-1; this LAN address is common to all the computers 31-1 to 31-n which constitute multi-computer system 31. With this design, computer 101 can communicate with multi-computer system 31 using a single LAN address, irrespective of which computer within the system 31 is designated as the master. That is, according to this embodiment, multi-computer system 31 appears as if to have only a single computer (and a single LAN controller) as viewed from computer 101, and it is not necessary that computer 101 consider in any way when communicating with system 31 which computer is the master.

Assume that in step S6, computer 31-1 is designated to be the master based on the control data stored in shared memory 30. Then, in step S8, a flag ON command from computer 31-1 is also supplied to interface control section 41-1 in LAN controller 32-1. This flag ON command sets the initially-set-OFF flag of flag register 45-1 to be on.

Upon setting the LAN address and the flag, computer 31-1 sends a receive request to LAN access section 42-1 through interface control section 41-1 in step S10, thereby rendering LAN access section 42-1 ready for reception. Other computers 31-j (j=2 to n) are slaves and their flags can not be set ON even if their common LAN address has been set. After sending the receive request, computer 31-1 awaits an interrupt in step S14, and during the time computer 31-1 is awaiting the interrupt, it is capable of executing other processes.

Assume now that a transfer frame whose destination address is the same as the LAN address set in LAN address register 46-1 is sent on LAN cable 30 by computer 101. LAN access section 42-1 is monitoring the transfer frame on LAN cable 30 in step S22. Upon reception of the transfer frame on LAN cable 30, LAN access section 42-1 checks whether or not this transfer frame has, as the destination address, the LAN address set in LAN address register 46-1, referring to the contents of this register 46-1. When the destination of the frame is found to be the system itself, the frame is transferred to reception buffer 44-1 for storing in step S24. After receiving the transfer frame (step S26), LAN access section 42-1 informs interface control section 41-1 of the reception. When informed of the frame reception by LAN access section 42-1, interface control section 41-1 refers to the content of flag register 45-1 in step S28 to determine whether or not the flag is ON. If the decision is negative (N), the flow returns to step S22, but if it is affirmative (Y), interface control section 41-1 stores the received frame in reception buffer 44-1, and then sends it over bus 34-1 to computer 31-1 in step S30. In the next step S32, interface control section 41-1 generates an interrupt to computer 31-1. Upon detecting the interrupt in step S14, computer 31-1 executes data processing in step S16. When the data processing is completed, computer 31-1 sends a reception request again in step S18, as mentioned earlier. When computer 31-1 is changed from the master to a slave during its operation, the decision in step S6 is N and the flow advances to step S12 where the flag of flag register 45-1 is set to be OFF, i.e., reset.

LAN controllers 32-j (j=2 to n) coupled to the other computers 31-j in multi-computer system 31, unlike LAN controller 32-1 of computer 31-1 that is available for communication, have the flags of their flag registers 45-j turned OFF. Therefore, even if LAN controllers 32-j can detect that the transfer frame from computer 101 is destined for their own system, the frame will not be transferred to computers 32-j from their interface controllers 41-j.

Referring now to FIGS. 3A and 3B, data transmission to computer 101 from computer 31-1 which is allowed for communication will be explained below.

When computer 31-1 needs to transmit data to computer 101 (step S62), it sends a transmit command to interface control section 41-1 of LAN controller 32-1 over bus 34-1 in step S64. Upon reception of the transmit command from computer 31-1 (step S70), interface control section 41-1 returns an acknowledge to computer 31-1 in step S72. In accordance with the response from interface control section 41-1 (step S66), computer 31-1 sends transmission data to the same section 41-1 in step S68. Upon reception of the transmission data from computer 31-1 (step S74), interface control section 41-1 stores the data in transmission buffer 43-1 and sends a transmit command to LAN access section 42-1 in step S76.

Upon reception of the transmit command, LAN access section 42-1 latches data stored in transmission buffer 43-1, affixes the LAN address set in LAN address register 46-1 to the data as the transmission address to form a transmission frame, and sends the frame onto LAN cable 30.

A LAN system according to a second embodiment of this invention will now be explained.

Figure 4:
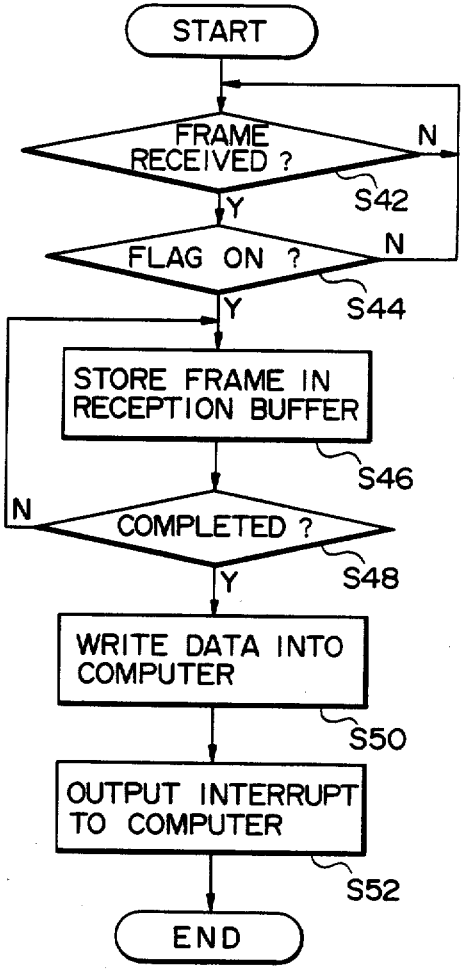
FIG. 4 is a flowchart for explaining a data reception operation according to another embodiment.

Of the structure and operation of the second embodiment, those common to the first embodiment will be omitted and only the differences will be explained referring to FIG. 4.

According to the second embodiment, LAN access sections 42-i discriminate whether or not to receive the transmission frame on LAN cable 30 in accordance with the flags set in their flag registers 45-i and the destination address in the frame.

When computer 31-1 becomes a master based on the control data stored in shared memory 30, a receive request is sent to LAN access section 42-1 through interface control section 41-1. Assume that a transmission frame whose destination address is the LAN address is sent onto LAN cable 30 from computer 101 (step S42). Then, LAN access section 42-1 refers to the flag set in flag register 45-1 (step S44) and the LAN address in register 46-1 to determine whether or not to receive the transmission frame. When computer 31-1 is the master, LAN access section 42-1 receives the frame and the received frame is stored in reception buffer 43-1. The subsequent processes are the same as those of the first embodiment.

Although LAN access sections 42-*i* provided for the individual computers in the above embodiments, a single LAN access section may be commonly provided for the multi-computer system. In this case, the flag is referred to and the frame is sent to the reception buffer coupled to that computer which serves as a master.

Similarly, a single flag register and a single LAN address register may be commonly provided for the system. In this case, the flag register holds status data that indicates which computer in the system is a master, but the operation is the same as that of the above modification.

What is claimed is:

1. A local area network system including a plurality of computer systems, comprising:
    a local area network bus for transmitting a frame containing frame data and a destination address;
    a plurality of interface means connected to the local area network bus, each corresponding to one computer system of said plurality of computer systems and each assigned an identical address, for selectively receiving the frame over said local area network bus in accordance with the destination address of the frame and the identical address; and
    a plurality of transfer means, each coupled between a corresponding computer system of the plurality of computer systems and a corresponding interface means, for transferring frame data in the received frame from said corresponding interface means to said corresponding computer system in accordance with transfer available data indicating whether said corresponding computer system can receive the frame data.

2. A system according to claim 1, wherein each of said plurality of transfer means includes:
    transfer memory means for storing the transfer available data; and
    means for reading out the transfer available data from said transfer memory means, and for transferring the frame data to said corresponding computer system in accordance with the transfer available data.

3. A system according to claim 2, wherein each of said plurality of computer systems includes means for writing the transfer available data in the transfer memory means in the transfer means corresponding to the computer system at times when the computer system can receive the frame data, and for resetting the transfer available data stored in said transfer memory means when said computer system cannot receive the frame data.

4. A system according to claim 1, wherein each of said plurality of interface means includes;
    interface memory means for storing the identical address;
    means for reading out the identical address from said interface memory means;
    means for comparing the identical address with the destination address of the frame; and
    means for receiving the frame when the identical address and the destination address coincide with each other.

5. A system according to claim 4, wherein each of said plurality of computer systems includes means for writing the transfer available data in the transfer memory means in the transfer means corresponding to the computer system at times when the computer system can receive the frame data, and for resetting the transfer available data stored in said transfer memory means when said computer system cannot receive the frame data.

6. A system according to claim 1, wherein each of said plurality of interface means further comprises means for storing the frame when the transfer available data indicates that said corresponding computer system can receive the frame data.

7. A local area network system including a plurality of computer systems, comprising:
    a local area network bus for transmitting a frame containing frame data and a destination address;
    interface means, assigned a specific address and connected to said local area network bus, for receiving the frame over said local area network bus in accordance with the destination address of the frame and the specific address; and
    a plurality of transfer means, each coupled between a corresponding computer system of the plurality of computer systems and said interface means, for transferring frame data from said interface means to said corresponding computer system in accordance with transfer available data indicating whether the corresponding computer system can receive said frame data.

8. A system according to claim 7, wherein said interface means includes:
    interface memory means for storing the specific address;
    means for reading out the specific address from said interface memory means;
    means for comparing the specific address with the destination address of the frame; and
    means for receiving the frame when the specific address and the destination address coincide with each other.

9. A system according to claim 7, wherein said interface means includes transfer memory means for storing the transfer available data, the transfer available data including a plurality of portions, and wherein each of said plurality of computer systems includes means for writing a portion of the transfer available data in said transfer memory means at times when the computer system can receive the frame data and for resetting the corresponding transfer available data portion stored in said transfer memory means when said computer system cannot receive the frame data.

10. A system according to claim 9, wherein said interface means further comprises means for storing the frame when the transfer available data indicates that said corresponding computer can receive the frame data.

11. A method of communication for a multi-computer system having a plurality of computer systems coupled to a local area network, said method comprising the steps of:
    receiving a frame over the local area network when a destination address of the frame is identical to a specific address of the multi-computer system; and
    transferring frame data of the frame to a first one of the plurality of computer systems in accordance with transfer available data indicating that the first computer system is a master.

12. A method according to claim 11, further comprising the step of updating the transfer available data to indicate that a second computer system of the plurality of computer systems is the master, when the master is changed from the first computer system to the second computer system.

13. A method according to claim 12, wherein the transfer available data includes a plurality of portions and said updating step includes resetting the transfer available data portion corresponding to said first computer system and setting the transfer available data portion corresponding to said second computer system.

14. A method according to claim 11, wherein said receiving step further comprises the step of storing a received frame in one of a plurality of buffers, each buffer associated with a different one of the plurality of computer systems, and wherein the storing step is performed only for the buffer associated with the computer system that the transfer available data indicates is the master.

* * * * *